(12) United States Patent
Halpern, III et al.

(10) Patent No.: US 9,152,641 B2
(45) Date of Patent: *Oct. 6, 2015

(54) METHOD AND SYSTEM FOR PROVIDING STORAGE DEVICE FILE LOCATION INFORMATION

(75) Inventors: Joseph Edward Halpern, III, Santa Clara, CA (US); Henry Hutton, Tracy, CA (US); Judah Gamliel Hahn, Ofra (IL); Moshe Raz, Kefar Rosh Hanikra (IL); In-Soo Yoon, Seoul (KR)

(73) Assignee: SanDisk Technologies Inc., Plano, TX (US)

( * ) Notice: Subject to any disclaimer, the term of this patent is extended or adjusted under 35 U.S.C. 154(b) by 341 days.

This patent is subject to a terminal disclaimer.

(21) Appl. No.: 13/327,447

(22) Filed: Dec. 15, 2011

(65) Prior Publication Data

US 2013/0159304 A1 Jun. 20, 2013

(51) Int. Cl.
*G06F 17/30* (2006.01)
*G06F 12/16* (2006.01)
*G06F 11/14* (2006.01)
*G06F 12/08* (2006.01)

(52) U.S. Cl.
CPC .......... *G06F 17/30091* (2013.01); *G06F 12/16* (2013.01); *G06F 11/1451* (2013.01); *G06F 11/1469* (2013.01); *G06F 12/08* (2013.01)

(58) Field of Classification Search
CPC ... G06F 17/30091; G06F 12/16; G06F 12/08; G06F 11/1451; G06F 11/1469
USPC .......................................... 707/737, E17.044
See application file for complete search history.

(56) References Cited

U.S. PATENT DOCUMENTS

| 5,226,145 | A | 7/1993 | Moronaga et al. |
| 5,390,318 | A * | 2/1995 | Ramakrishnan et al. ..... 711/158 |
| 7,395,048 | B2 | 7/2008 | Kotzin |
| 7,574,580 | B2 | 8/2009 | Mahashin et al. |
| 7,689,805 | B2 | 3/2010 | Moore et al. |
| 2003/0189589 | A1 | 10/2003 | LeBlanc et al. |
| 2005/0039177 | A1 | 2/2005 | Burke et al. |
| 2006/0184720 | A1 | 8/2006 | Sinclair et al. |

(Continued)

OTHER PUBLICATIONS

Roddy, Mark, "Adventures in Luserland: Finding Disk Sectors Associated with File Records." Retrieved from: http://www.wd-3.com/archive/luserland.htm on Jul. 12, 2010, Copyright 2003 (10 pages).

(Continued)

*Primary Examiner* — Mardochee Chery
(74) *Attorney, Agent, or Firm* — Brinks Gilson & Lione

(57) ABSTRACT

A method and system are disclosed that permit a host application to obtain cluster location data, for example logical addresses associated with the clusters of a file, and to allow a host application to communicate the logical block address mapping information to firmware of a storage device. The method includes the host transmitting one or more clusters or partial clusters having a signature to the storage device where the storage device knows or has been instructed by the host to look for the signature. The storage device may receive clusters having a signature and, responsive to a host request, return logical address information to a host for the location in the storage device of the marked clusters. The host may parse a data structure on the storage device to obtain remaining cluster location information using a file's first cluster location or may request that the storage device return the cluster location information.

19 Claims, 7 Drawing Sheets

(56) References Cited

U.S. PATENT DOCUMENTS

| | | |
|---|---|---|
| 2006/0218347 A1 | 9/2006 | Oshima |
| 2007/0143532 A1 | 6/2007 | Gorobets et al. |
| 2007/0179854 A1 | 8/2007 | Ziv et al. |
| 2008/0082736 A1 | 4/2008 | Chow et al. |
| 2008/0307158 A1 | 12/2008 | Sinclair |
| 2009/0089366 A1 | 4/2009 | Toth |
| 2009/0187709 A1* | 7/2009 | Chen et al. .................... 711/115 |
| 2009/0210631 A1 | 8/2009 | Bosworth et al. |
| 2009/0316007 A1 | 12/2009 | Ito et al. |
| 2010/0049758 A1 | 2/2010 | Kumar |
| 2010/0153673 A1 | 6/2010 | Shen et al. |

OTHER PUBLICATIONS

International Search Report and Written Opinion issued in international application No. PCT/US2012/066835, mailed Feb. 8, 2013 (14 pages).

* cited by examiner

METHOD AND SYSTEM FOR PROVIDING STORAGE DEVICE FILE LOCATION INFORMATION

CROSS-REFERENCE TO RELATED APPLICATIONS

This application relates to co-pending U.S. application Ser. No. 13/327,463 entitled "Method and System for Providing Storage Device File Location Information," filed the same day as the present application, the entirety of which is hereby incorporated herein by reference.

TECHNICAL FIELD

This application relates generally to a method and system for providing an application on a host device with logical mapping information for a file on a storage device.

BACKGROUND

Non-volatile memory systems, such as flash memory, are used in digital computing systems as a means to store data and have been widely adopted for use in consumer products. Flash memory may be found in different forms, for example in the form of a portable memory card that can be carried between host devices or as a solid state disk (SSD) embedded in a host device. These memory systems typically work with data units called "blocks" that can be written, read and erased by a storage manager often residing in the memory system.

When writing data to a conventional flash memory system, a host typically assigns unique logical addresses to sectors, clusters or other units of data within a continuous virtual address space of the memory system. The host writes data to, and reads data from, addresses within the logical address space of the memory system. The memory system then commonly maps data between the logical address space and the physical blocks or metablocks of the memory. The memory system keeps track of how the logical address space is mapped into the physical memory but the host is almost always unaware of this. The host keeps track of the addresses of its data files within the logical address space but the memory system usually operates without knowledge of this mapping.

Applications on a host, however, may not have access to information on the logical addresses, referred to herein as a logical block addresses (LBAs), that the host operating system has assigned to files, directories or system areas. Applications on a host may only have high level file system application programming interfaces (APIs). Thus host applications do not generally have direct access to the file system structures maintained by the host operating system and cannot determine how the storage device driver on the host will translate requests made via the APIs into LBAs for file writes.

In many instances, it is desirable for a storage device, such as a flash memory card, to perform operations such as encryption, data optimization, or other processing on a specific file. However, while storage devices have full visibility regarding sectors actually written to the card, they generally lack the processing power to parse and maintain the file system themselves. Furthermore, the assumption in host environments is that the host owns and maintains the file system, and thus data relating to file structures is not communicated to storage devices in a simple or timely manner. Further complicating matters, host applications typically do not have direct access to the file system structures maintained by the host operating system, and thus do not have the ability to directly communicate parameters such as LBA maps to the storage device.

One possible approach for providing LBA information to host applications is to use a host that is configured to give applications direct access to the storage device's logical address space. Such direct access to a storage device by a host application is generally not available in hosts such as portable handsets, and is limited in many personal computer (PC) operating systems as well. Another possible approach for providing LBA information to host applications is to use a storage device-based approach where the storage device is aware of the file system. In such a storage device-based approach, the storage device would need the ability to read and navigate the file system, monitor writes to a file, force flushing of host file system caches, and do look-up operations to find files within folders in the file system. This approach would be resource intensive and not particularly practical in storage devices such as flash memory cards with limited controller capabilities.

BRIEF SUMMARY

In order to address the problems and challenges noted above, a system and method for communicating file system information to an application on a host is disclosed. According to a first aspect, a method for managing a storage device is disclosed. The method includes, in a host operatively coupled to a storage device, the host writing a signature to a cluster for transmission to the storage device, for each of a plurality of clusters corresponding to a particular host file. The signature may be written to any sector within the cluster, one or multiple times, and with fixed or random offsets within the cluster. For example, the signature may only be written to the first sector within the cluster and only the first sector written to the storage device. The host transmits each of the plurality of clusters with the signature to the storage device. The host receives cluster location data from the storage device in response to transmitting the plurality of clusters with the signature to the storage device, where the cluster location data is information on a location in the storage device logical address space in the form of LBAs or offsets or indices of clusters of the particular host file. In other embodiments, the method may include transmitting a signature definition command to the storage device prior to transmitting each of the plurality of clusters, where the signature definition command may include a signature that may be associated with a particular host file. The method may also include transmitting a stop or disable signature command to the storage device after transmitting a last cluster of the particular host file which will indicate to the storage device that it can stop looking for the signature sent via the preceding signature definition command.

In another aspect, a method for managing a storage device includes, in a host operatively coupled to a storage device, the host writing a signature associated with a particular host file to only a first sector, block or cluster of the particular host file for transmission to the storage device. The host transmits a first portion of file content for the particular host file with the signature to the storage device and receives cluster location data from the storage device, where the cluster location data contains information on a location in the storage device of the first cluster of the particular host file. The host then instructs the storage device, based on the location of the first cluster, to read a file system data structure in the storage device and return information on the locations of additional clusters of the particular host file.

In yet another aspect, a storage device is disclosed. The storage device includes a memory configured to store host files and a file system data structure containing information on a location of clusters for host files in the memory system, and a controller in communication with the memory. The controller is configured to receive a plurality of clusters from the host and identify sectors or clusters marked by a signature. The controller of the storage device, in response to a host request, is further configured to provide location information for sectors or clusters marked by the signature. In one implementation, the storage device is configured to continuously look for marked sectors or clusters from the host. In other implementations the controller of the storage device is configured to look for sectors or clusters signed by an application of the host after receiving a signature definition command from the host, and configured to stop looking for signed sectors or clusters after receiving a signature stop or disable command.

In other implementations, the controller of the storage device receives only a first sector or cluster of the particular host file having the signature, and returns the sector or cluster location data on only a location in the storage device of the first sector or cluster of the particular host file. The controller of the storage device is configured to start looking for a pre-determined signature or for a unique signature that may be associated with a specific file after it receives a signature definition command from the host and can be configured to stop looking for a signature when it receives a stop or disable signature command from the host. The controller of the storage device may be configured to look for a new signature when it receives a different signature definition command and stop looking for the old signature. The controller of the storage device may also be configured to look for multiple signatures at once.

DETAILED DESCRIPTION

Figure 1:
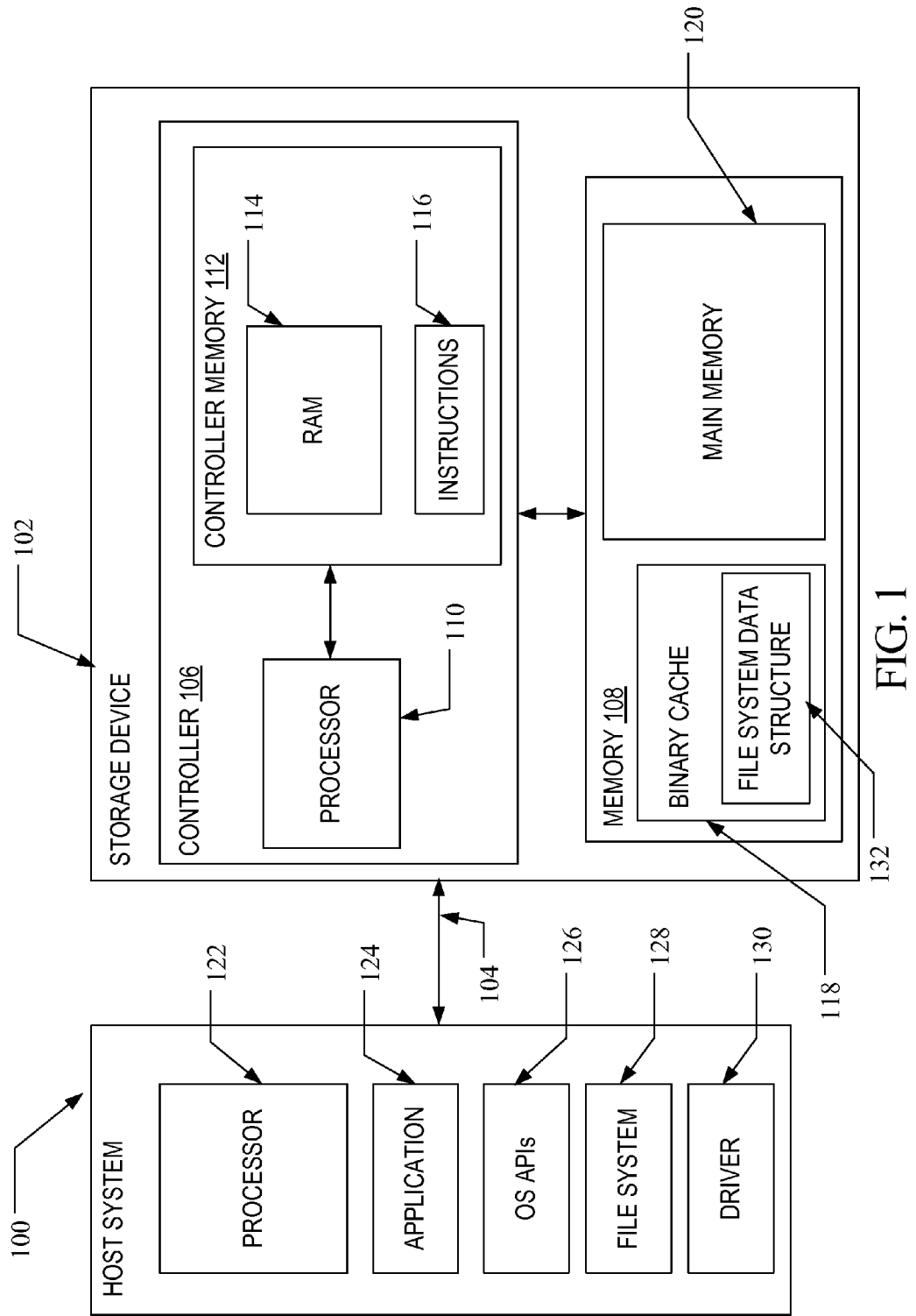
FIG. 1 illustrates a block diagram of a storage device and host according to one embodiment.

A flash memory system suitable for use in implementing aspects of the invention is shown in FIG. 1. A host system 100 stores data into, and retrieves data from, a storage device 102. The storage device 102 may be embedded in the host system 100 or may exist in the form of a card or other removable drive, such as a solid state disk (SSD) that is removably connected to the host system 100 through a mechanical and electrical connector. The host system 100 may be any of a number of fixed or portable data generating devices, such as a personal computer, a mobile telephone, a personal digital assistant (PDA), or the like. The host system 100 communicates with the storage device over a communication channel 104.

The storage device 102 contains a controller 106 and a memory 108. As shown in FIG. 1, the controller 106 includes a processor 110 and a controller memory 112. The processor 110 may comprise a microprocessor, a microcontroller, an application specific integrated circuit (ASIC), a field programmable gate array, a logical digital circuit, or other now known or later developed logical processing capability. The controller memory 112 may include volatile memory such as random access memory (RAM) 114 and/or non-volatile memory, and processor executable instructions 116 for handling memory management.

As discussed in more detail below, the storage device 102 may include functions for memory management. In operation, the processor 110 may execute memory management instructions (which may be resident in instructions 116) for operation of the memory management functions, such as detailed in FIGS. 2-6. The memory 108 may include non-volatile memory (such as flash memory). One or more memory types may compose memory 108, including without limitation single level cell (SLC) type of flash configuration and multi-level cell (MLC) type flash memory configuration. The SLC flash may be configured as a binary cache 118 and SLC or MLC may be used as main storage 120. The binary cache and main storage of memory 108 includes physical blocks of flash memory that each consist of a group of pages, where a block is a group of pages and a page is a smallest unit of writing in the memory. The physical blocks in the memory include operative blocks that are represented as logical blocks to the file system 128. The storage device 102 may be in the form of a portable flash drive, an integrated solid state drive or any of a number of known flash drive formats.

The host 100 of FIG. 1 may include a processor 122 that runs one or more application programs 124. The application programs 124, when data is to be stored on or retrieved from the storage device 102, communicate through one or more operating system application programming interfaces (APIs) 126 with the file system 128. The file system 128 may be a software module executed on the processor 122 and manages the files in the storage device 102. The file system 128 manages clusters of data in logical address space. Common operations executed by a file system 128 include operations to create, open, write (store) data, read (retrieve) data, seek a specific location in a file, move, copy, and delete files. The file system 128 may be circuitry, software, or a combination of circuitry and software. Accordingly, the file system 128 may be a stand-alone chip or software executable by the processor of the host 100. A storage device driver 130 on the host 100 translates instructions from the file system 128 for transmission over a communication channel 104 between the host 100 and storage device 102. The interface for communicating over the communication channel may be any of a number of known interfaces, such as SD, MMC, USB storage device, SATA and SCSI interfaces. A file system data structure 132, such as a file allocation table (FAT), may be stored in the memory 108 of the storage device 102. Although shown as residing in the binary cache portion 118 of the memory 108, the file system data structure 132 may be located in the main memory 120 or in another memory location on the storage device 102.

Figure 2:
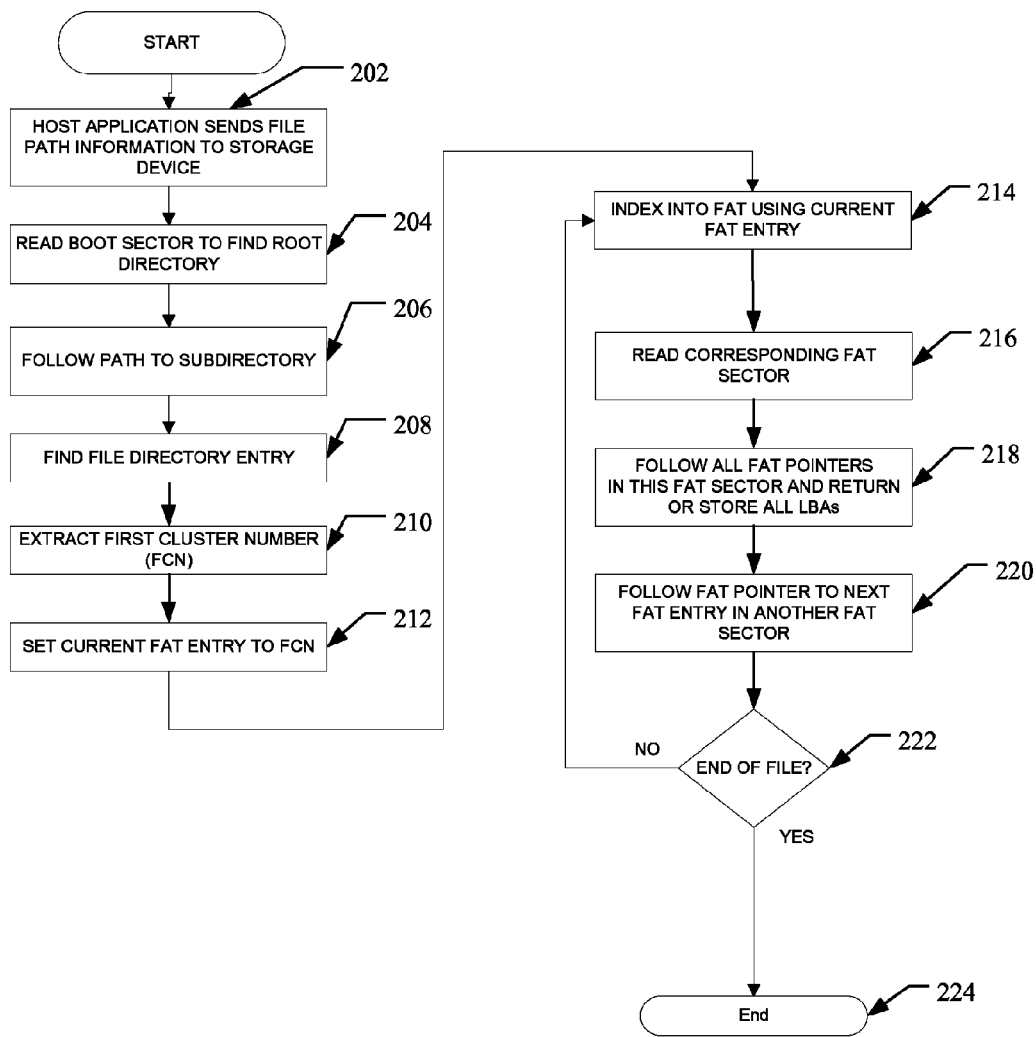
FIG. 2 is a flow chart of a method of cluster walking for providing logical block address (LBA) information for a file from a storage device to a host application.

In a system such as described above, one method of providing LBA information to a host application 124 includes "cluster walking" such as set forth in FIG. 2. In the embodiment of FIG. 2, the storage device 102 works cooperatively with the host 100 to construct a table of LBAs corresponding to the clusters stored on the storage device 102. In this implementation, some of the work may be performed by the host and some by the storage device 102. The host application 124 sends the storage device file path information of the file for which the application 124 wants the LBA information (at 202). The communication between the host 100 and storage device 102 may be over a file based communication channel (FBCC) which is a virtual channel where commands are recognized by the storage device and the host because of a pattern embedded in the data. Any of a number of types of patterns may be implemented by the FBCC to flag the presence of a command. For example, the storage device 102 may be configured to look for a pattern at the beginning of each burst of data (e.g. cluster) received that would alert the storage device 102 that a command is contained in that burst of data.

The controller 106 of the storage device 102 first examines the boot sector of the file system 132 to find the root directory (at 204). The storage device controller 106 then searches through the root directory to find the next part of the path. If there are subdirectories in the path, the storage device 102 will recursively find and follow each subdirectory until if finds the file of interest or determines that there is no file on the storage device 102 that matches the path (at 206). For example, for the path "C:\folder1\folder1-2\filename.jpg", the root contains the folder "folder1" which contains the folder "folder1-2", which contains the file "filename.jpg".

Once the file has been located, the controller 106 will find the directory entry of the file, which will contain the location of the beginning of the file. For FAT file systems, this is instantiated as a First Cluster Number (FCN) of the file. The controller 106 will extract the FCN (at 208, 210). The FCN is the logical address in the storage device memory 108 which contains the data at the beginning of the file. There should be a corresponding entry in the file system data structure 132, such as a FAT table, for this cluster address (at 212). This entry in the FAT table points to the NEXT entry in the FAT table, which is the next 32K of data (for example if the cluster size is 32K) in the file, and so forth, so the controller 106 can index into the FAT using the current FAT entry and read the corresponding FAT sector to obtain the cluster addresses in the FAT sector associated with the file as shown in 214, 216. Cluster addresses are related to LBA addresses in the logical address space of the storage device 102. The LBA address can be computed from the cluster address using a simple calculation, such as multiplying the cluster address by the cluster size (the number of LBAs per cluster) used by the storage device (at 218) and adding the offset of the start of the file system (whose location is provided in the file system root directory at 204). The controller 106 will then follow the FAT pointers for any FAT entries in the current FAT sector that are contained within the file, until the next entry points to outside of the current FAT sector (at 220). If the next entry is an end of file marker, then all the LBA information for the file has been retrieved and the cluster walking process stops (at 222, 224). If the next entry does not indicate that the end of the file has been reached, then the controller 106 indexes into the FAT using the current FAT entry and another corresponding FAT sector is read (at 222, 214, 216).

The storage device 102 can either communicate the entire cluster chain (list of LBAs that may be maintained in, for example, a table) it has found within the file to the host application 124 at one time, or it can communicate interactively with the host 100 and build the cluster chain for the file one or more FAT sectors at a time until the entire list has been transmitted. In the latter iterative approach, one or more LBAs may be returned each time the host application 124 requests LBA information. For example, the storage device may return as many LBAs as it finds for the current FAT sector, where there are multiple FAT entries per FAT sector. In order for the storage device 102 to send the entire list of LBAs for the file at once, the storage device 102 may store the list in a hidden location in memory 108 on the storage device, where the hidden memory may be a location not mapped to a host addressable LBA.

Cluster walking generally requires elevated processing overhead and functional capabilities, such as a knowledge of the directory structure and of the FAT, on the part of the storage device 102.

In another implementation, an approach for obtaining LBA information, or for allowing a host application 124 to direct the storage device to immediately act on data at an LBA address without knowing in advance the LBA address, is through cluster painting. Cluster painting is a more host-intensive process and generally requires less processing overhead and functional capabilities from the storage device 102 than the cluster walking technique. Cluster painting involves the host 100 marking or "painting" the cluster prior to or in addition to writing data to it. As described in greater detail below, the host 100 paints a cluster by providing a special signature associated with data written to the storage device 102 that the storage device can detect and act on. A primary purpose of cluster painting is to tag clusters so that certain clusters are marked as a spot where certain operations are to take place. This painting technique avoids the need for a full file path look-up that is needed in the cluster walking technique described above. In fact, with the cluster painting technique, the storage device 102 does not need to understand anything about the format or geometry of the host file system at all. If the host application 124 desires to obtain the LBAs for the marked (painted) clusters, then a separate command, such as a read LBA command sent over the FBCC, may be utilized to instruct the storage device 102 to return the LBA for the most recently marked cluster, or the LBA can be returned as a required or optional part of the status return for the command used to mark the cluster.

In the cluster painting approach, the signature sent by the host 100 with one or more clusters of data may be a predetermined signature already known to the storage device 102, or may be a signature provided to the storage device by the host in a signature definition command that informs the storage device of what to look for. Also, the host 100 may instruct the storage device 102 to initiate and stop looking for clusters marked by a signature, or the storage device may be configured to always look for marked clusters. In embodiments where the storage device 102 is not preconfigured to always look for marked clusters, the host 100 may "switch" the storage device in and out of a mode where the storage device is looking for clusters marked with a signature. In one implementation, the signature definition command sent by the host 100 to the storage device 102 acts as a start command to cause the storage device to begin looking for clusters marked with the signature, and a signature stop or disable command causes the storage device to stop looking for signed clusters.

In an alternative implementation, the host 100 may switch the storage device 102 in and out of a mode where the storage device looks for signed clusters with a paint accumulate start command and a paint accumulate stop command. The paint accumulate start command may also cause the storage device 102 to create a list of all marked clusters. The paint accumulate start and stop commands are useful if the host 100 wants the storage device 102 to mark and remember multiple or all the clusters in a file and then have the storage device transmit location information for the marked clusters all at once. If the host 100 will send separate commands to ask for the cluster location information after, or as part of, each paint (i.e. concurrently with or after each signed cluster is sent and before another signed cluster is sent) then there is no need for using paint accumulate start and stop commands to tell the storage device 102 when to start and stop compiling the list.

Figure 3A:
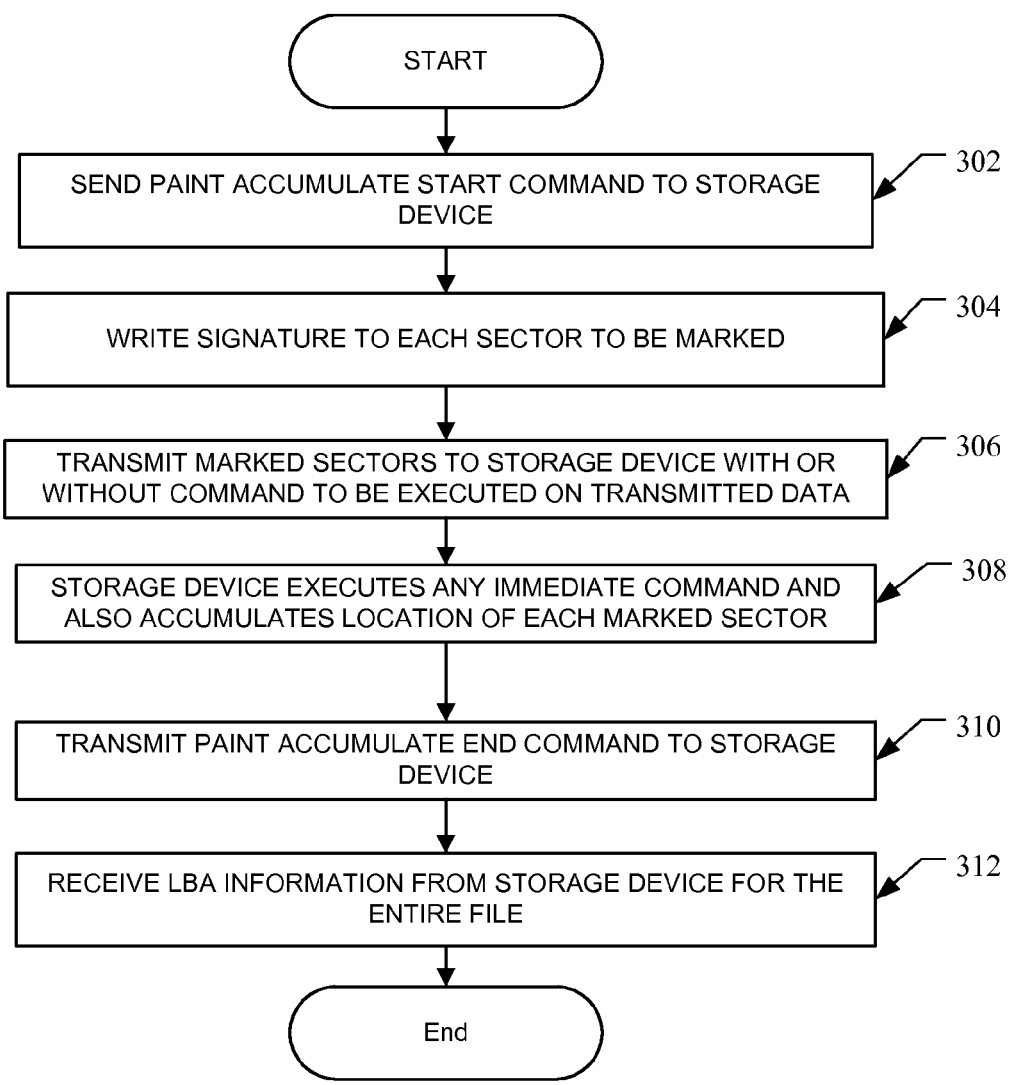
FIG. 3A is a flow chart illustrating an alternative embodiment for providing LBA information for a file from a storage device to a host application.

Referring to FIG. 3A, an example of cluster painting which returns location information using a paint accumulate start and paint accumulate stop command is illustrated. To initiate the cluster painting process, the host processor 122, executing a host application API 126, may cause the host 100 to transmit a paint accumulate start command to the storage device 102, which indicates to the storage device controller 106 that it should start to accumulate a new list of locations that will be marked while painting. This initialization command, or a separate one transmitted before or after the paint accumulate start command, may include a signature that can be (but doesn't need to be) associated with one particular host file (at 302). The application 124 on the host 100 instructs an API 126 to cause the file system 128 to write the signature to each cluster or sector of data corresponding to the particular host file for transmission to the storage device 102 (at 304). The host 100 transmits each of the clusters or partial clusters (which may be a little as a single sector if the particular host file system architecture permits) with the signature to the storage device 102 (at 306). The host 100 will typically be configured to transmit an entire cluster at once, but can also transmit only part of a cluster to the storage device 102. The storage device 102 may only understand individual sectors or blocks of sectors. Optionally, the command may also cause the data to be transmitted to have an operation applied to it, such as for the data to be encrypted or decrypted. The storage device controller 106 understands where the operation should occur because the command or operation code is transmitted concurrently with the signature or afterwards in the vicinity where the signature was written (e.g. the command may contain offsets from the actual location where the sector was painted).

Note that the immediate command which is executed "here" and the return of the LBA information about where "here" is located are independent. The paint command may paint a location merely to locate it. The paint command may paint a location to apply an immediate or subsequent operation on the data written at that location. Alternatively, the paint command may both specify an immediate command and collect location information at the same time.

After transmitting a last cluster of the particular host file, the host 100 may transmit a command indicating the end of the process for accumulating location information (e.g. a paint accumulation stop command) to the storage device 102 (at 308). The host 100 may then retrieve either the entire list at once or parts of the list for the entire file (at 312). Alternatively, the paint accumulate stop command may be used to cause the storage device 102 to reset a list of accumulated locations of the signature and restart accumulation of location information at the storage device on subsequent instances of the signature detected in received data.

Figure 3B:
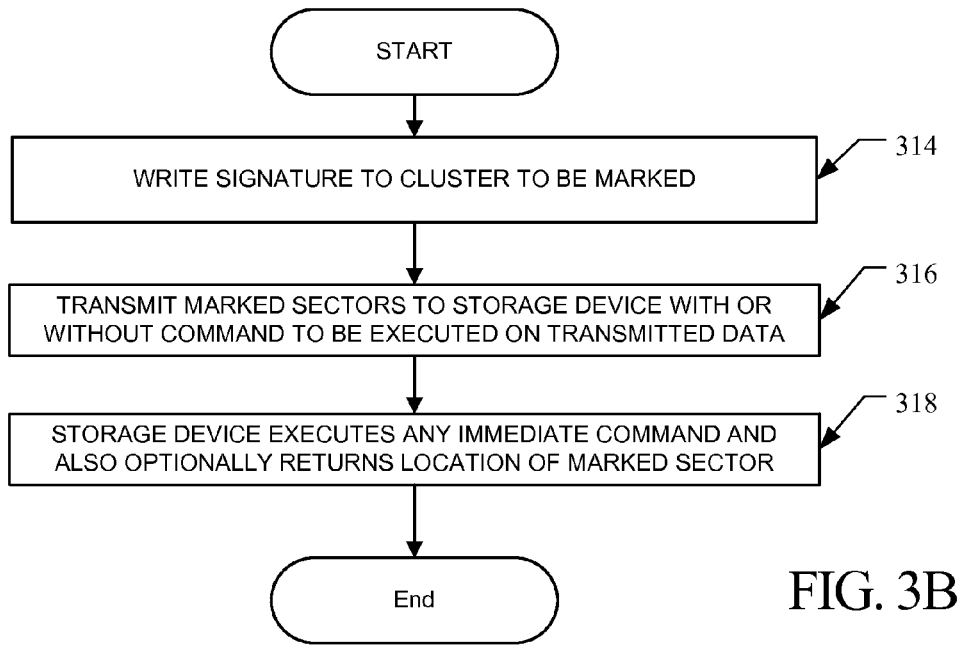
FIG. 3B is an alternative embodiment of the method illustrated in FIG. 3A.

In another implementation, as shown in FIG. 3B, the host 100 can iteratively request LBA information immediately after painting each cluster or a number of clusters rather than send a paint accumulate start and stop command to continuously accumulate a list of cluster locations marked with a signature. Also, as in the technique described in FIG. 3A, cluster painting may be used to cause the storage device 102 to immediately execute a command on the marked cluster rather than waiting to paint all the clusters in the file and finding out the LBA information associated with the painted clusters. In the implementation of FIG. 3B, the host 100 writes a signature to a cluster (at 314) and may send a command or operation code concurrently with the signature (at 316). The command or operation code may be, for example, an instruction for the storage device 102 to encrypt the marked cluster. The storage device 102 may then execute any immediate command (operation) associated with the marked cluster and, if also requested in the command, return the location information for the marked cluster (at 318). In other alternative implementations, a command from the host 100 sent concurrently with marking the cluster may be an instruction to implement the command on a range of clusters. In yet other implementations, the signature may be sent from the host 100 to the storage device 102 with a command to have the storage device remember that marked cluster for a later action to be taken, rather than taking immediate action on the marked cluster.

Figure 4:
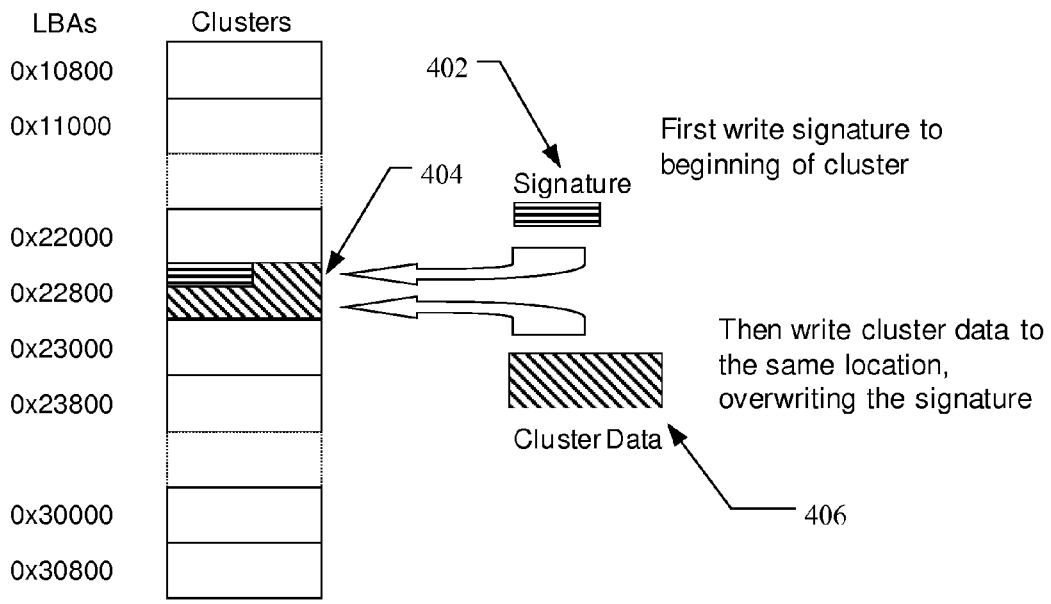
FIG. 4 is a cluster diagram showing an arrangement of signature and cluster data that may be written to a cluster of a painted file according to the methods of FIGS. 3A and 3B.

As illustrated in FIG. 4, in the cluster painting process the host 100 may write the signature 402 to the beginning of each cluster 404 in the identified host file and then write cluster data 406 for the host file to the same location. In one embodiment, the cluster data 406 may be written to the cluster 404 such that it is appended to the signature 402 in the same cluster. In another embodiment, the cluster data 406 may be written to the same cluster 404 as the signature 402, but the cluster data overwrites the signature. The signature 402 may be written to any sector within the cluster 404, one or multiple times, and with fixed or random offsets within the cluster. For example, the signature 402 may only be written to the first sector within the cluster 404 and only the first sector written to the storage device 102.

The storage device 102 may receive commands to initialize the process of scanning for or accumulating locations painted using the cluster painting technique, or to define or redefine the signature that will indicate a command or paint operation, by a command transmitted over a standard command channel, such as an ASSD (Advanced Security SD) channel, that supports commands that are independent of data to be written to the storage device memory 108. The signatures and LBA information may then be communicated using a command channel protocol that supports transmission of LBA information, such as FBCC or any other command channel recognized by both the host 100 and the storage device 102. Alternatively, commands to initialize or end the scanning for a signature or the accumulation of LBA location information, may be included as part of standard host read or write commands all within an FBCC command channel protocol. Also, the storage device 102 may utilize any of a number of file system data structures 132, such as an array or table, for example a FAT32 or exFAT file system.

The transmission of a signature definition command to alert the storage device to start or stop looking for clusters marked with a particular signature is entirely optional. In the embodiments of FIGS. 3A and 3B, the cluster painting procedure may be turned on or off by the host 100 using a start command and an end command (e.g. paint accumulate start and stop or signature identification and signature stop commands) to alert the storage device 102 to look for clusters that are signed. Because the storage device 102 uses processing resources when monitoring for the signatures, the use of these start and stop commands may be advantageous to avoid wasting limited processing resources in the storage device when the host is not interested in obtaining LBA information. In an alternative embodiment, the storage device 102 may be configured to always look for the signed clusters. In this alternative embodiment, no signature definition or start or end commands are necessary or utilized because the storage device 102 will monitor all incoming clusters for possible signatures. In this alternative embodiment, the storage device 102 may be pre-programmed to recognize one or more signatures and the host is aware of the signature(s) that the storage device is preprogrammed to recognize. In embodiments that utilize a cluster painting start and/or end command, the host 100 may inform the storage device 102 of what signature to look for as part of the start or end command.

Figure 5:
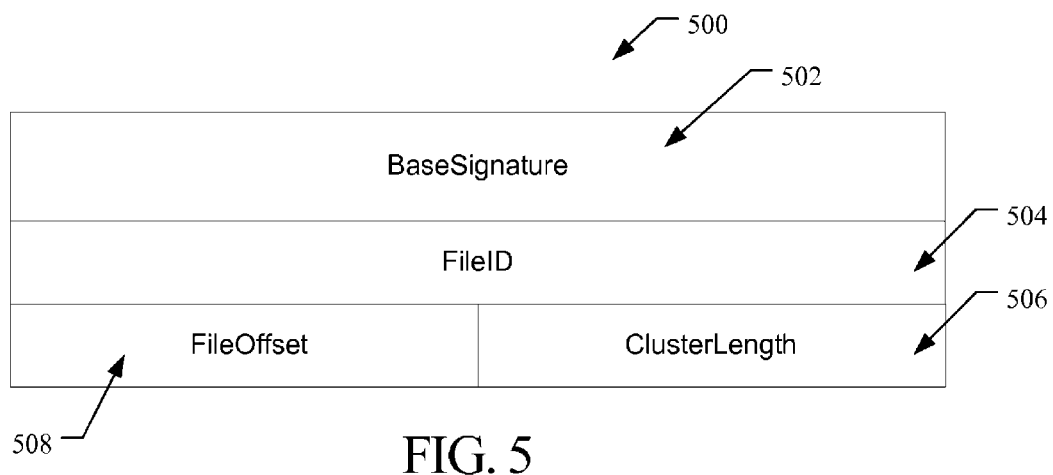
FIG. 5 is a signature format for use in the methods of FIGS. 3A and 3B.

In one implementation of cluster painting, the host 100 may sign all or a plurality of the clusters of a file. Any of a number of signature formats may be used by the host 100 to paint the relevant cluster or clusters of a particular file. One example of a suitable signature 500 is illustrated in FIG. 5. The signature 500 may contain a BaseSignature 502 that may be a fixed value or may be set via a signature definition command. A FileID 504 may be included that corresponds to a specific host file. If the BaseSignature 502 is set as part of a signature definition command, then the FileID is optional. The BaseSignature+FileID may uniquely identify a specific host file. A ClusterLength 506 can be a fixed or variable value and may be the number of sectors in the cluster being transmitted with the signature 500. The FileOffset 508 represents the offset of the current cluster within the file. The signature 500 may be written anywhere within a cluster or always to a predetermined location or offset within a cluster, for example the beginning of a cluster.

With cluster painting, the storage device 102 need not be aware of the file system and the storage device 102 avoids the processing overhead involved in the cluster walking technique of FIG. 2. Instead, cluster painting places more of the burden on the host 100 so that the storage device 102 simply needs to monitor for any writes from the host 100 that begin with a particular signature. If the signature is detected in a standard file write, then the storage device 102 is made aware that data written to the range of LBAs starting from that location is to be treated specially, for example that the data is to be encrypted. Part of the information written with the signature may be the size of the range of LBAs. An advantage of the cluster painting technique is that no matter what the internal state of the operating system file system tables is within the host system 100, the correct LBA will be referenced. Writing the signature informs the firmware in the storage device 102 to, in effect, "write the data here". The host application 124 doesn't need to know the final LBA of the data written. The storage device 102 can keep track of the cluster range of sectors and can perform a desired function, such as encryption, on any sector written within the range. This process is duplicated for each cluster in the file. As described above, in some embodiments, at the end of the file, another command or a different signature received from the host 100 can tell the storage device 102 to stop looking for the signature.

If the host 100 sends a command to the storage device to return LBA information, the storage device 102 may then return the LBAs associated with the "painted" clusters via a command channel to the host application 124. The cluster painting technique effectively provides to the host application 124 a low-level access to the logical block addresses that are missing from the host operating system and file system. A host application 124 can use the LBA information received from the storage device 102 to build its own table of LBA addresses. This is simpler to implement for the storage device 102 than cluster walking, especially when more than one file system format or multiple cluster sizes may be in use in the storage device memory 108.

In embodiments where the storage device 102 provides start and end commands to alert the storage device to initiate and terminate monitoring for painted clusters, information that identifies a specific file may be omitted. Thus, any signed clusters will be identified during the period between receipt of the start and stop commands regardless of whether they may belong to the same host file. Assuming the host 100 sends a command to return LBA information with the signed clusters, the storage device 102 will return LBA information for the signed clusters without knowledge or data on whether all the signed clusters it received belonged to different host files. Similarly, in embodiments where the cluster painting technique is always on in the storage device 102 (i.e. where no start or stop commands limit the period of time the storage device is monitoring for a signature), the storage device may only be made aware of a single signature, or have a preloaded signature it looks for, and will simply execute a command or operation requested by the host 100 on each marked cluster it sees regardless of whatever host file the cluster is associated with. In such embodiments, the host may transmit to the storage device a "clear" command that resets the storage device buffers used to accumulate LBA location information.

Figure 6:
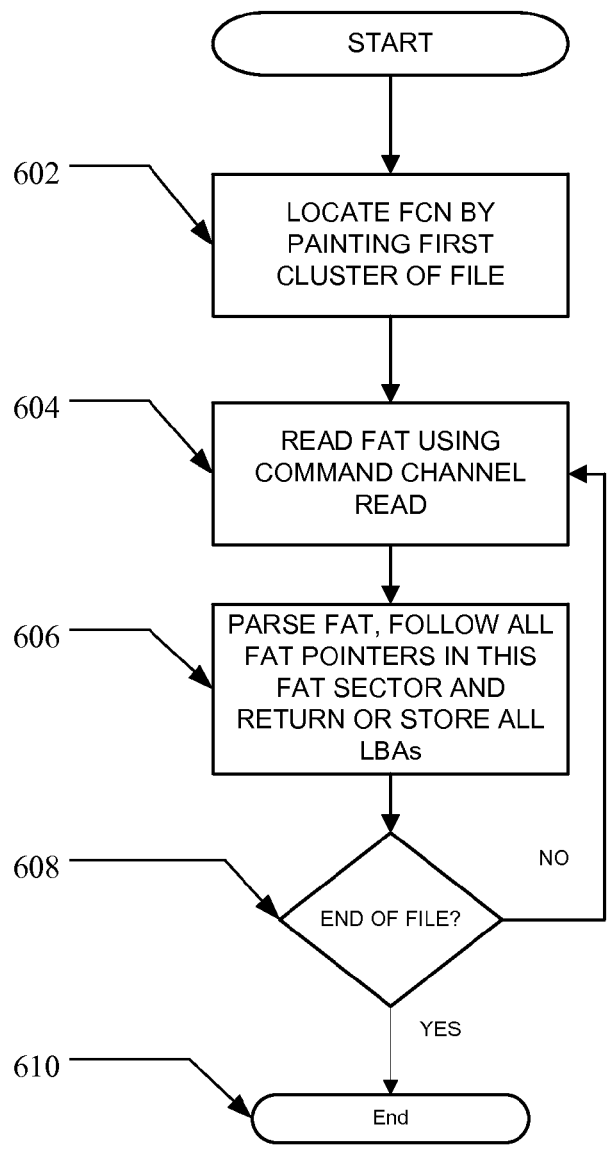
FIG. 6 is a flow chart illustrating an alternative embodiment of the method of FIG. 2 and the methods of FIGS. 3A and 3B.

Another embodiment of providing LBA information for a file to a host application 124 is shown in FIG. 6. In the method of FIG. 6, a combination of the cluster walking technique (FIG. 2) and the cluster painting technique (FIGS. 3A and 3B) is shown, herein referred to as hybrid cluster walking. Hybrid cluster walking permits the task of locating the LBA information for a cluster chain of a file to be split up between the host 100 and the storage device 102. The host 100 provides information to the storage device 102 regarding the first cluster of the file using any of the cluster painting technique embodiments described above to only "paint" (i.e., to only write a signature to) the first cluster of the file (at 602). The host 100 obtains the LBA of the first cluster either via a return LBA parameter included in the paint command or by sending a subsequent read LBA command to the storage device to obtain the LBA information for the painted cluster.

Once the first cluster number (FCN) is returned by the storage device 102, the host 100 can use the first cluster number to compute the logical address within the file system data structure 132 of the beginning of the cluster chain or the location within host directory where space allocation is described for the file. The host 100 can then instruct the storage device 102 to then read the portions of the file system data structure 132 directly from the storage device memory 108 using a command channel read command (at 604). The storage device 102 will then retrieve and transmit to the host the portions of the file system data structure 132 requested in the read command and the host 100 will parse the file system data structure 132 (e.g. FAT) and determine, based on the retrieved information, what additional portions of the file system data structure 132 are needed next to locate the entire cluster chain for the file associated with the first cluster number (at 606). Thus, the host 100 parses the FAT, following all FAT pointers in a FAT sector on the storage device 102, and retrieves LBA information for the file until the end of the file is located in the FAT (at 608). This cluster chain information may then be communicated to the card firmware to allow the host application 124 to inform the storage device 102 to implement a feature such as encryption directly to all the LBA locations in the particular file.

Figure 7:
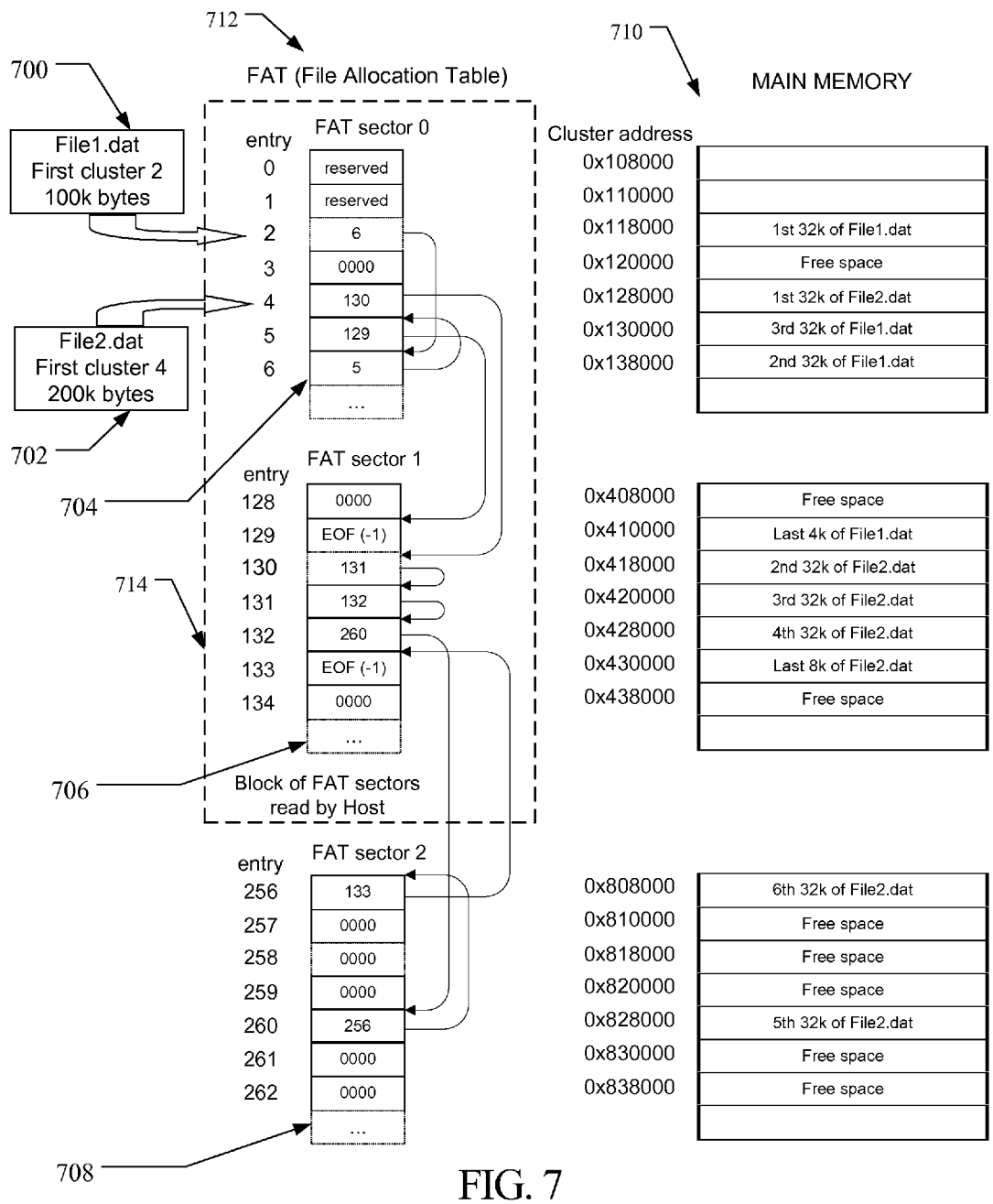
FIG. 7 is an example file system data structure and associated memory in a storage device showing cluster chains for different files.

Unlike the cluster walking version discussed with respect to FIG. 2 above where the controller 106 of the storage device 102 performed the task of parsing the FAT or other file system data structure 132, in the hybrid cluster walking technique of FIG. 6 the host may parse the FAT based on the FCN returned from the storage device 102. In this embodiment of hybrid cluster walking, the host 100 uses the starting cluster address obtained via cluster painting, computes the FAT sector LBA where this cluster entry can be found and then walks the remaining chain of the FAT table in order to obtain a complete list of LBAs for all clusters in the file. The host 100 may construct this list of LBAs by directly reading FAT sectors one or more sectors at a time and walking the cluster chain using host software that only needs to be file-system aware enough to follow the FAT chain. Alternatively, the host 100 can provide the FCN back to the storage device 102 and request that the storage device follow the cluster chain. This variation is similar to the logic in full cluster walking but allows simplified logic in the storage device 102. Specifically, the storage device 102 does not need to understand how to follow a file path to a specific starting cluster, and only needs to understand the chain information in file system data structure 132 that allows it to accumulate the cluster locations of the entire file. The storage device 102 may include instructions 116 to parse the file system data structure 132, for example a FAT table as illustrated in FIG. 7, by following pointers in the FAT table until an end of file identifier is found. Thus, the host may iteratively request portions of the FAT to walk through to find relevant clusters for the file, may request the entire FAT at one time, or may ask the storage device to walk through the sectors of the FAT and return, at one time or in blocks or chunks of sector addresses, all clusters in the chain for the file associated with the FCN.

In the implementation where the host 100 paints the first cluster to obtain the FCN for a file from the storage device 102 and then asks the storage device 102 to use the FCN and accumulate the cluster information for that file, the procedure is very similar to full cluster walking (FIG. 2) except that steps 202-210 are replaced with the paint operation, and then the storage device "accumulates" the cluster locations following steps 212-224. Another way of looking at this is that in FIG. 6, the loop of steps 604-608 can either be executed by the host (reading FAT sectors and parsing them) or by the storage device.

In one implementation of hybrid cluster walking, only three storage device commands need to be implemented: a command to initiate cluster painting that may incorporate parameters such as BaseSignature 502 and FileID 504 discussed previously; a write command to paint a cluster and return the LBA number for the painted cluster (i.e., the cluster where the signature is written); and a command to return arbitrary LBA sector or block contents from the FAT. In other embodiments of hybrid cluster walking, where no start command is used for cluster painting and the storage device is always actively monitoring for signed clusters, there may only be a need for two of these commands: a write command to paint a cluster and a command to read arbitrary LBA sector or block contents from the FAT. The read arbitrary LBA sector or block command can be limited to only the file system data structure 132 area of the storage device memory 108 or it may have access to the entire storage device memory 108. Similarly in the implementation of hybrid cluster walking where the host 100 asks the storage device 102 to parse and accumulate cluster information, only two commands may be needed: a write command to paint a cluster and a read command to return cluster chain addresses, with the FCN passed in as a parameter to the read command.

Referring to FIG. 7, a simplified example is provided of how file system data structure entries (here FAT chains) and clusters in memory relate to each other and to host files. Two files, File1.dat 700 and File2.dat 702 are illustrated in the context of the clusters stored in the main memory 710 (corresponding to main memory 120 in the storage device 102) that make up the files 700, 702 and the corresponding FAT entries that map the clusters in main memory 710. Each of the files 700, 702 have information in a FAT file directory stored in main memory 710, including the filename, starting sector, and length of the file in bytes. In other file systems, this directory information may be interspersed with the file allocation information.

File1.dat 700 is 100 k bytes in length or 3 full 32 k byte clusters plus 4 k bytes in a fourth cluster in main memory 710. All the links in the FAT chain for File1.dat happen to be entirely within the first two sectors 704, 706 of the FAT 712. For File1.dat 700 the 4 clusters in main memory 710 containing the data for File1.dat are at cluster addresses 0x118000, 0x138000, 0x130000 and 0x41000. The cluster addresses are mapped in the sectors of the FAT 712, where each sector may include 1 or more entries identifying clusters of a file. For File1.dat 700, the FAT entries corresponding to the file are entries 2, 6, 5 in the first FAT sector 704 and entry 129 in the second FAT sector 706, where entry 129 contains an end of file (EOF) marker indicating the last cluster of File1.dat. Each entry in the FAT 712 includes a FAT pointer that points to the next entry for the file, as indicated by the next entry number at each entry and the curved arrow to that next entry, until the EOF marker is reached.

Two sectors of FAT, as shown within the dashed line 714, is one example of a reasonable quantity of FAT data that the host 100 might read in at once (although the number could be much higher, including the entire FAT in some circumstances) as the host 100 predicts where the next set of cluster chain links might appear. Assuming that links are forward chained is usually a good assumption when the main memory 710 is empty and new. Over time, usage and fragmentation tend to introduce the backward pointing links in the FAT 712, at which point the host may need to re-request earlier sectors of the FAT when later sectors have pointers linking back to earlier sectors of the FAT.

File2.dat 702 is 200 k bytes in length (6 full clusters plus 8 k from a seventh). The entries of the FAT chain for File2.dat spill over to a 3rd FAT sector 708 so a second access would be needed by a host caching two FAT sectors at a time. Because the end of file (EOF) link for File2.dat is actually back in the second FAT sector 706, a re-read by the host 100 of that sector might be necessary.

The example of FIG. 7 is a very simplified example that assumes a FAT 32 type of file system data structure with a cluster size of 32K (the default format and cluster size for SD cards between 2 GB and 32 GB). A single 2 GB video file would typically have over 61,000 cluster links requiring 477 sectors of FAT in a best case scenario where the video file is perfectly contiguous. FIG. 7, however, demonstrates how sectors in the FAT 712 can be read by the host 100 either one at a time or as groups of sectors and parsed to extract the cluster location information of where the data for files, such as example files File1.dat 700 and File2.dat 704, using hybrid cluster walking or any combination of the LBA acquisition techniques described herein.

Although LBA acquisition using techniques of cluster walking, cluster painting and hybrid cluster walking have been described above with the respect to FAT file structures, it is contemplated that these techniques may be utilized for any of a number of known file system data structure formats that maintain a record of clusters, where clusters are defined herein as a group of sequential LBAs of a size determined by the file system 128. Also, the invention contemplates the possibility of use in file system aware storage devices, i.e., in the presence of a file system and file system management within the storage device. In such cases, the embodiments discussed above may coexist with, and be used alongside, file system aware capabilities of the storage device. These features may operate in the storage device independently and unaware of each other.

Multiple embodiments may also be operative at the same time, e.g. the storage device may implement cluster painting, regular cluster walking using file system aware capabilities, and hybrid cluster walking as independent options for the host application. As one example, a file system aware storage device and host might use hybrid cluster walking to write an encrypted file, and use file system aware capabilities to read the same file once it has been closed or written, to duplicate, stream, send or backup the file or to transform the file into another format. The host is aware of reading and using the LBA list to write the file, but may be unaware of asynchronous activities that the file system aware storage device has undertaken contemporaneously.

Systems and methods for allowing efficient use of host and storage device resources for permitting a host application to communicate file system layout information to firmware applications on a storage device have been disclosed. According to one method, a cluster painting technique may be initiated by a host where each cluster of a file has a signature written to it by the host so that the storage device knows to perform an operation relating to the signed cluster. In one example, the signed cluster may be accompanied by a command to encrypt the cluster, while in other examples, the storage device may be configured or instructed to add each cluster having a signature for a particular file to a list of cluster information that can be used to return a complete cluster chain for the file.

According to another method, a hybrid method of cluster painting and cluster walking may be implemented where the host signs only the first cluster of a file and the storage device returns a first cluster number for use by the host to then read the file system data structure (e.g. FAT) to obtain the entire cluster chain for the file. A storage device is also disclosed having a memory and a controller configured to either receive a signature definition command from a host before beginning to monitor for clusters signed by the host, or to continuously monitor for incoming clusters having a known signature. The storage device may then receive clusters for the particular file from the host, where all the clusters for the particular file include the signature (cluster painting technique), or only the first cluster of the particular host file is "painted" to include the signature (hybrid cluster walking technique). The controller of the storage device may then receive a signature stop or disable command after receiving a last cluster of the particular host file and may transmit cluster location data accumulated by the storage device, or it may provide cluster location information as it receives marked clusters in embodiments where the storage device is configured to return location information after each paint operation. The controller of the storage device may be configured to look for a new signature when it receives a different signature definition command and stop looking for the old signature. The controller of the storage device may also be configured to look for multiple signatures at once.

In the cluster painting technique, the processor of the storage device may use the marked cluster in a number of alternative ways. For example, the processor may immediately perform an operation on the marked cluster or a range of clusters relative to the marked cluster, may be instructed to later perform an operation on the marked cluster or a range of clusters relative to the marked cluster, may send cluster location back to the host immediately after receipt of a marked cluster or may accumulate cluster location data and send out the cluster location data for the entire cluster chain of the file. Other variations are also contemplated. In the hybrid cluster walking technique, only the first cluster is signed by the host and the processor of the storage device only sends a location in the storage device of the first cluster number (FCN) of the particular host file. The host can then use that FCN to parse the file system data structure (e.g. FAT), determine what additional FAT information to request from the storage device, and send host data structure read commands (e.g. a Read LBA command) with the locations in the FAT the storage device is to access for LBA information. Once the location information has been obtained by the host using cluster walking after determining the first cluster number via cluster painting of the first cluster, the host application may then utilize the file location information for more efficiently executing operations on the desired data in the storage device.

It is therefore intended that the foregoing detailed description be regarded as illustrative rather than limiting, and that it be understood that it is the following claims, including all equivalents, that are intended to define the spirit and scope of this invention.

What is claimed is:

1. A method for managing a storage device, the method comprising:
   in a host operatively coupled to a storage device, the host:
      writing a signature to a cluster for a particular host file;
      transmitting the cluster with the signature to the storage device; and
      receiving cluster location data from the storage device in response to transmitting the cluster with the signature to the storage device, the cluster location data comprising information on a location in the storage device of the cluster of the particular host file.

2. The method of claim 1, further comprising writing the signature to each of a plurality of clusters for the particular host file and transmitting each of the plurality of clusters with the signature to the storage device, wherein receiving cluster location data comprises receiving cluster location information in response to each transmission of each of the plurality of clusters.

3. The method of claim 1, further comprising writing the signature to each of a plurality of clusters for the particular host file and transmitting each of the plurality of clusters with the signature to the storage device, wherein receiving cluster location data comprises receiving cluster location information for all clusters of the particular file after transmitting all of the clusters of the particular file.

4. The method of claim 1, further comprising transmitting a signature definition command to the storage device prior to transmitting the cluster, wherein the signature definition command includes the signature for which the storage device will monitor and that is associated with the particular host file.

5. The method of claim 4, further comprising transmitting a signature stop or disable command to the storage device configured to cause the storage device to cease monitoring for the signature.

6. The method of claim 1, further comprising the host transmitting a paint accumulate start command to the storage device prior to transmitting the cluster containing the signature, wherein the paint accumulate start command is configured to cause the storage device to start storing location information of each subsequent instance of the signature detected by the storage device.

7. The method of claim 6, further comprising the host transmitting a paint accumulate stop command to the storage device, wherein the paint accumulate stop command is configured to cause the storage device to stop storing location information for instances of the signature detected by the storage device, or to reset a list of accumulated cluster location information of the signature and restart accumulation for subsequently detected instances of the signature.

8. The method of claim 1, wherein writing the signature comprises writing the signature to a predetermined location in the cluster of the particular file.

9. The method of claim 1, wherein the cluster location data comprises logical location data.

10. The method of claim 5, wherein the host transmits the signature definition command, the signature stop or disable command, the paint accumulate command, and the paint accumulate stop command to the storage device singularly or in combination via write commands or read commands.

11. The method of claim 5, wherein the host transmits the signature definition command the signature stop or disable command, the paint accumulate command, and the paint accumulate stop command to the storage device singularly or in combination via commands separate from write commands or read commands.

12. A method for managing a storage device, the method comprising:
in a host operatively coupled to a storage device, the host:
writing a signature associated with a particular host file to only a first cluster of the particular host file;
transmitting a first portion of file content for the particular host file with the signature to the storage device;
receiving cluster location data from the storage device, the cluster location data comprising information on a location in the storage device of the first cluster of the particular host file; and
instructing the storage device, based on the location of the first cluster, to read a file system data structure in the storage device and return information from the file system data structure on a location of additional clusters of the particular host file.

13. The method of claim 12, wherein instructing the storage device further comprises instructing the storage device to return data from the file system data structure and the host iteratively parses the returned data from the file system data structure to obtain the location of the additional clusters.

14. The method of claim 12, wherein instructing the storage device further comprises instructing the storage device to parse the file system data structure and return an entire chain of the location information for the additional clusters to the host.

15. The method of claim 12, wherein the first portion of file content comprises the first cluster of the particular host file.

16. The method of claim 15, further comprising transmitting a signature definition command to the storage device prior to transmitting the first portion of file content, wherein the signature definition command includes the signature for which the storage device will monitor and that is associated with the particular host file.

17. The method of claim 16, further comprising transmitting a signature stop or disable command to the storage device configured to cause the storage device to cease monitoring for the signature.

18. The method of claim 17, wherein the host transmits the signature definition command and the signature stop or disable command to the storage device via a write command or a read command.

19. The method of claim 18, wherein the host transmits the signature definition command and the signature stop or disable command to the storage device via a command separate from a write command or a read command.

* * * * *